H. C. WARGENSTED.
SPRING WHEEL.
APPLICATION FILED JAN. 17, 1917.
1,244,265.
Patented Oct. 23, 1917.
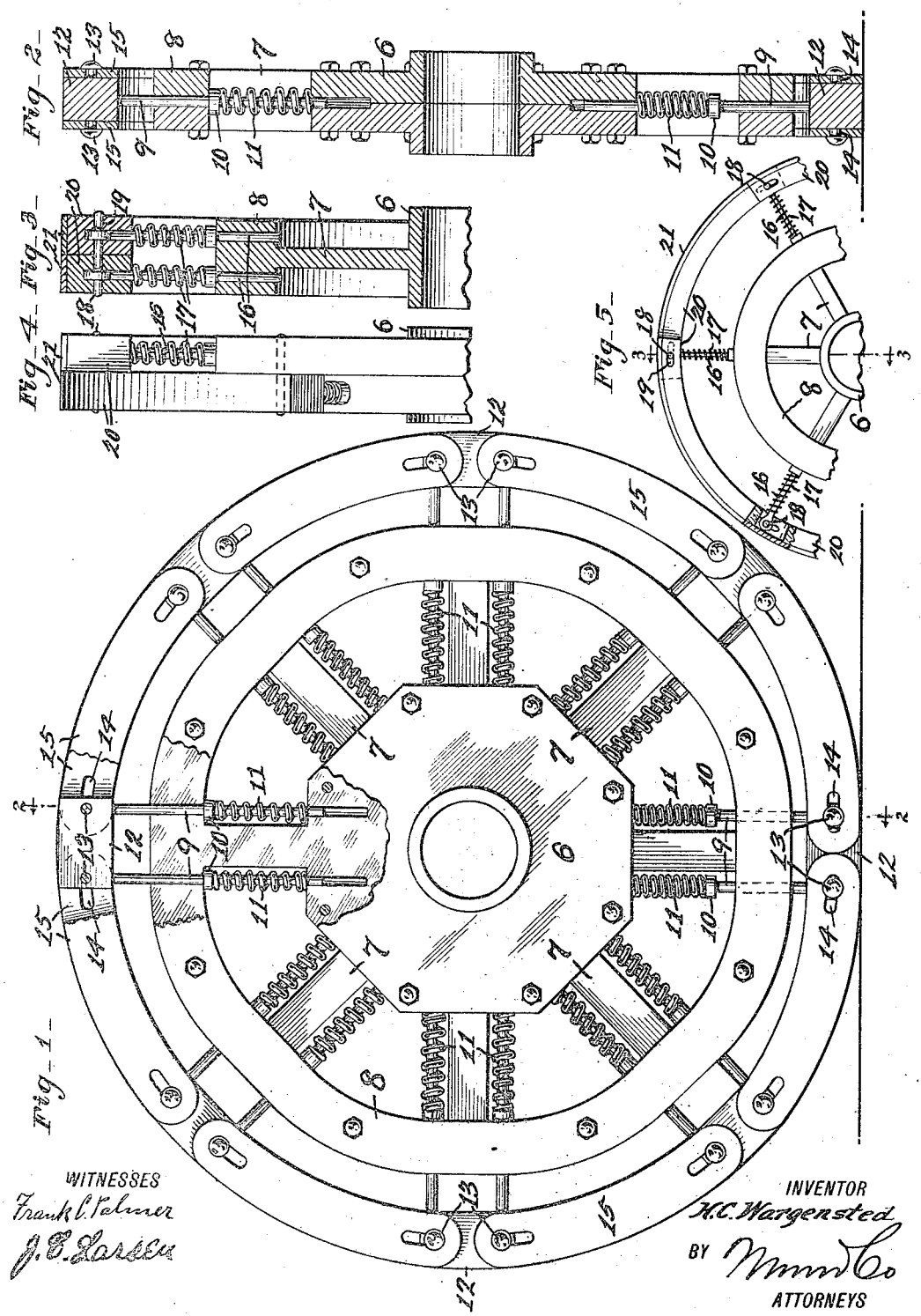
WITNESSES
Frank C. Palmer
J. E. Larsen
INVENTOR
H. C. Wargensted
BY Munn & Co
ATTORNEYS

UNITED STATES PATENT OFFICE.

HENRY CARL WARGENSTED, OF CARLINVILLE, ILLINOIS, ASSIGNOR OF ONE-HALF TO GUSTAVE H. MIEHER, OF CARLINVILLE, ILLINOIS.

SPRING-WHEEL.

1,244,265. Specification of Letters Patent. Patented Oct. 23, 1917.

Application filed January 17, 1917. Serial No. 142,804.

*To all whom it may concern:*

Be it known that I, HENRY C. WARGENSTED, a citizen of the United States, and a resident of Carlinville, in the county of Macoupin and State of Illinois, have invented certain new and useful Improvements in Spring-Wheels, of which the following is a specification.

My invention relates to resilient wheels adapted for solid rubber tires and possessing all the advantages of pneumatic tires without any of their disadvantages.

One of the main objects of the invention is to provide a flexible spring resisted rim supported in such manner as to prevent movement other than radially of the wheel, said rim being composed of articulating sections, either in pivotal connection with each other or in pivotal connection with interposed elements mounted in a yieldingly resisted manner.

My invention is fully described in the following specification, of which the accompanying drawings form a part, in which like characters refer to like parts in each of the views, and in which:—

Figure 1 is a side elevation of one embodiment of my invention, partly broken away to show structural details;

Fig. 2 is a section taken on the line 2—2 of Fig. 1;

Fig. 3 is a fragmentary section similar to Fig. 2, showing a modification, as on the line 3—3 of Fig. 5;

Fig. 4 is a fragmentary edge view of said modified form; and

Fig. 5 is a fragmentary side elevation thereof.

Referring to the drawings, 6 represents a hub having spokes 7 carrying a felly 8, illustrated as consisting of two similar members bolted together and each member being formed with the hub, spokes, and felly, as a unit, but I do not confine myself to this specific structure although I will make the hub, spokes, and felly as a unit.

Slidably guided in the hub and felly, one on each side of each spoke in the plane of all the spokes, are rods 9 having flanges 10 thereon normally held against the felly by springs 11 interposed between said flanges and said hub, and the outer ends of each pair of rods 9 carry a block 12 having pins 13 passed laterally therethrough adjacent the ends thereof.

The pins 13 pass through slots 14 in links 15 spanning the spaces between adjacent blocks 12 on each side of the latter, the pins being headed so as to imprison said links, said blocks and links collectively forming the rim of the wheel and being adapted to receive and hold a solid rubber tire held thereon in any desired manner, not shown.

By reference to Fig. 1 it will be seen that the rim yields under load to produce the easy riding qualities of a pneumatic tire but without any danger of deflation from punctures, blow-outs, and the like, and this is equally true under impact, as by the wheels striking a curb or other object elevated above a road, the slots 14 accommodating the rim links to the shorter radius at the load bearing point.

The form illustrated in Figs. 3, 4 and 5 is essentially the same as that already described, the distinction thereof being in the fact that the rods and springs are in laterally arranged pairs interposed between the felly and rim, shown at 16 and 17, respectively, the rods 16 having pins 18 passed laterally therethrough and into slots 19 in arcuate rim members 20, a tire holding rim 21 being provided if desired on the outer sides of said members 20.

Having fully described my invention, what I claim as new, and desire to secure by Letters Patent, is:—

In a resilient wheel, the combination with a hub, felly and spokes, of radially arranged spring-pressed rods projecting through the felly, arcuate blocks on the outer ends of the rods, pairs of curved link members having their ends lapped upon the sides of the blocks, and pin-and-slot connections between the link members and the blocks, said members and blocks forming the tread rim, as shown and described.

HENRY CARL WARGENSTED.

Copies of this patent may be obtained for five cents each, by addressing the "Commissioner of Patents, Washington, D. C."